Oct. 2, 1951      T. W. MILLNS      2,569,898
GAS TURBINE

Filed Jan. 26, 1949      2 Sheets-Sheet 1

Inventor
T. W. Millns

Oct. 2, 1951  T. W. MILLNS  2,569,898
GAS TURBINE

Filed Jan. 26, 1949  2 Sheets-Sheet 2

Inventor
T. W. Millns

Patented Oct. 2, 1951

2,569,898

UNITED STATES PATENT OFFICE 2,569,898

GAS TURBINE

Terence William Millns, London, England, assignor to Rotax Limited, London, England Application January 26, 1949, Serial No. 72,953
In Great Britain February 3, 1948

3 Claims. (Cl. 253—59)

This invention relates to gas turbines, and has for its object to minimize risk of injury to the rotor in the event of its being accidentally rotated an an excessive speed.

In the accompanying drawings, Figure 1 is a part sectional side elevation of a gas turbine embodying the invention.

Figure 1:
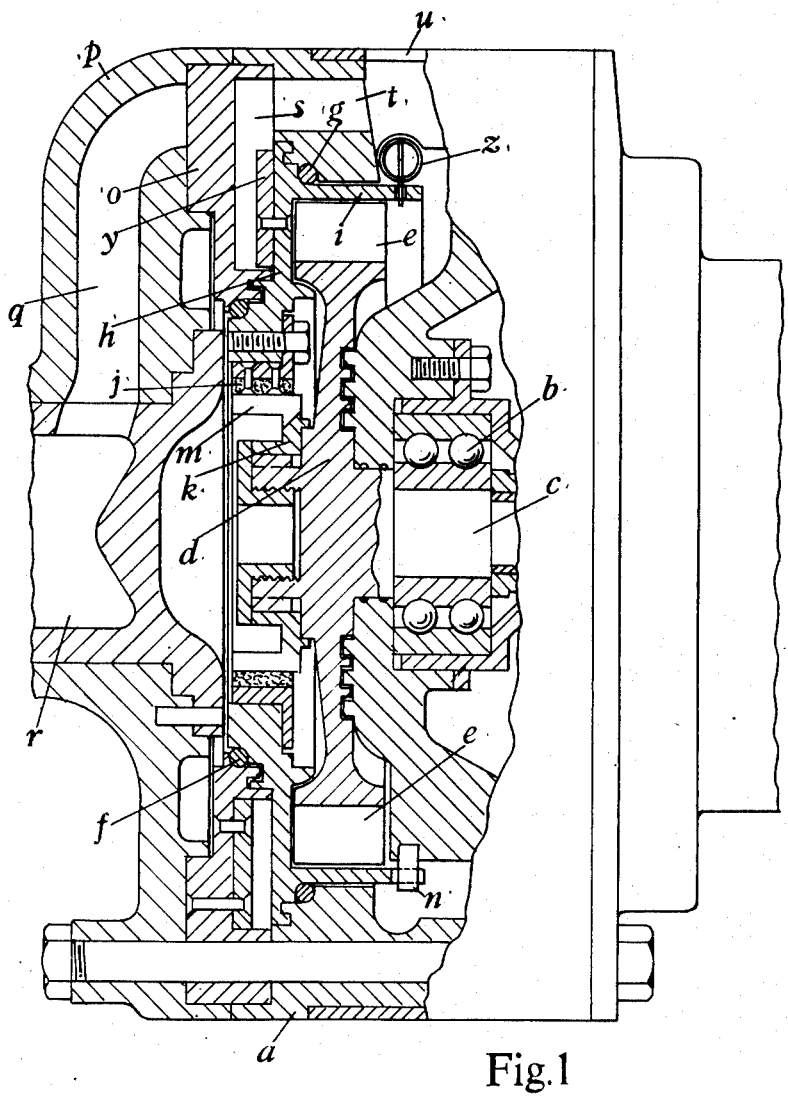

Referring to Figure 1, there is contained within the housing $a$ a bearing $b$ which carries the spindle $c$ of the turbine rotor $d$, the latter having blades $e$ formed on or secured to its periphery. At one side of the rotor there is rotatably supported in the housing by bearings $f$, $g$, an annular nozzle plate $h$ which has formed on it a laterally extending flange $i$ which surrounds and is closely adjacent to the rotor blading, the inner periphery of this plate being lined with a ring $j$ of friction material. Within the plate $h$ there is mounted a clutch disc $k$ which is secured to the adjacent face of the rotor, and has formed on it a laterally projecting and flexible peripheral flange $m$, which is split radially at a number of positions (see Figure 2) to enable it to expand into contact with the friction ring $j$ under the action of centrifugal force when the speed of the rotor exceeds a predetermined amount. When this speed is attained, the clutch $k$ by its action on the nozzle plate $h$ imparts to the latter an angular movement which is restricted to an appropriate amount in any convenient manner, as, for example, by a stop peg $n$ secured to the housing and extending across a notch in the flange $i$ of said plate.

Alongside the movable nozzle plate $h$ there is mounted in the housing a fixed nozzle plate $o$, this being held in position by the adjacent end cover $p$ of the housing in which are formed (for example four) equi-spaced motive fluid passages $q$ extending radially from a common inlet $r$.

Figure 3:
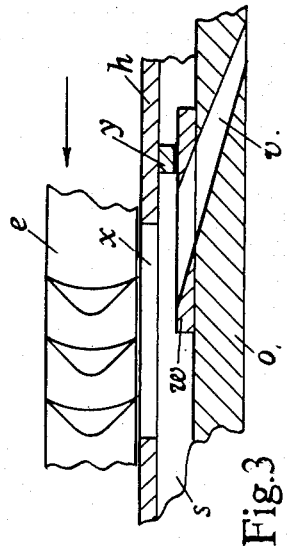
Figure 3 is a fragmentary sectional plan illustrating the portion of the controlling means associated with one of the nozzles and an adjacent portion of the rotor.
Figure 2:
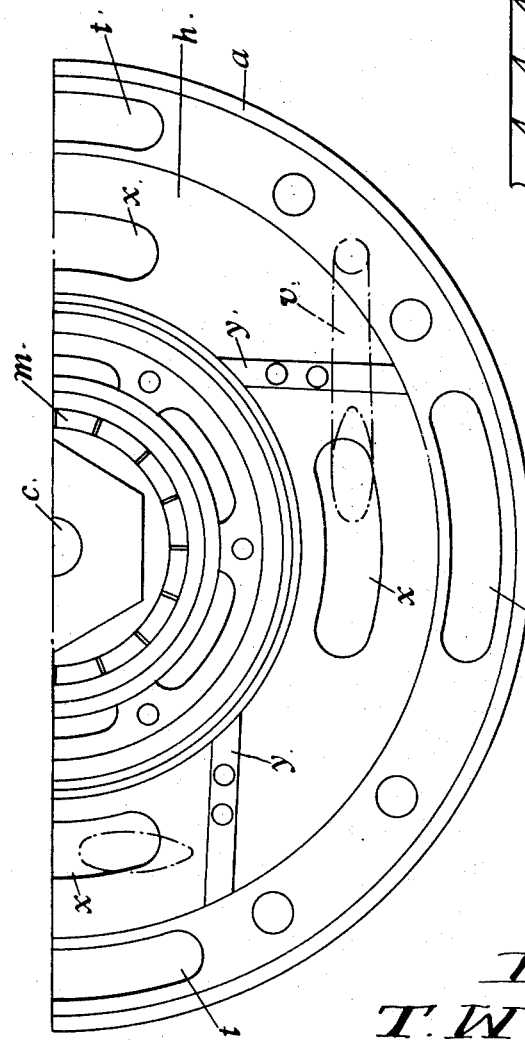
Figure 2 is an end elevation of one half of the turbine, with the left hand portion of Figure 1 removed to expose the controlling means associated with the motive fluid inlet nozzles.

The plane of section of the view shown in Figure 1 does not admit of the representation therein of the nozzle passages which lead from the passages $q$ to the rotor blading, but one such passage is clearly shown in Figure 3, which will now be described in conjunction with Figures 1 and 2.

In the side of the fixed nozzle plate $o$ adjacent to the movable nozzle plate $h$ is formed an annular recess $s$ which is open adjacent to its outer periphery to by-pass outlet passages $t$ in the housing leading to the main outlet $u$. Also in the fixed nozzle plate $o$ are formed (for example four) motive fluid passages $v$ each of which at one end is open to the associated inlet passages $q$. Each such passage extends through a plate $w$ secured to the fixed plate $o$, and immediately opposite the discharge end of the passage $v$ there is formed in the movable plate $h$ an orifice $x$ through which the motive fluid can pass to the rotor blading $e$ after crossing the recess $s$. Further, there is secured to the plate $h$ adjacent to one end of each orifice $x$ a rib $y$ which abuts against or lies closely adjacent to the outer face of the plate $w$.

The mode of action is as follows: So long as the rotor is rotating at a predetermined speed, the nozzle plates occupy the relative positions shown in Figure 3. But in the event of that speed being exceeded, the effect of centrifugal force on the expansible periphery $m$ of the clutch part $k$ causes it to engage the friction ring $j$ and move the plate $h$ (in the direction of the arrow, Figure 3) to an extent permitted by the stop peg $n$ and so cause each of the ribs $y$ to be moved to the opposite side of the orifice in the plate $w$. The motive fluid flowing through the passages $v$ to the blading $e$ is thereby intercepted by the plate $h$ and diverted radially outwards across the recess $s$ to the by-pass passages $t$, thus putting the rotor out of action.

To enable the plate $h$ to resume its normal position after the speed of the rotor has become sufficiently reduced to release the clutch member $k$, any convenient spring or equivalent means may be used. In one arrangement a plurality of springs $z$ (of which one is shown in Figure 1) are arranged in the housing in connection with the plate $h$, and adapted to return it to its initial position after release by the clutch member. It is desirable, however, that return of the plate $h$ to its initial position after release shall not occur until the flow of motive gas through the passages $v$ has been interrupted, or sufficiently reduced, and this requirement is met by the pressure of the diverted gas streams against one side of the ribs $y$, this pressure being sufficient to hold the plate $h$ against the action of the springs until the gas flow has been sufficiently reduced.

The particular example above described is especially suitable for use as a part of an enginestarting machine, the turbine rotor being driven by gas supplied from an explosive charge contained in a cartridge. In such use the automatic return of the movable nozzle plate (in the event of its displacement as a result of excessive speed of the rotor), occurs at or towards the end of the discharge from the cartridge, in readiness for actuation by a successive cartridge discharge.

Having thus described my invention what I claim as new and desire to secure by Letters Patent is:

1. A gas turbine comprising in combination a rotor having peripheral blading, a housing containing the rotor, a movable nozzle member of annular form mounted in the housing at one side of the rotor, and capable of angular movement between a normal position in which motive fluid can flow therethrough to the rotor blading, and another position in which motive fluid is deflected away from the rotor blading by the nozzle member, and a clutch disc situated within the annular nozzle member and secured to the rotor, the clutch disc having a laterally projecting peripheral flange which is split transversely at a plurality of positions to render it resilient and capable of outward radial deflection under the action of centrifugal force into frictional engagement with the annular nozzle member, so that the latter is displaceable by the clutch disc to the position for deflecting the motive fluid away from the rotor blading when the speed of the rotor exceeds a predetermined limit.

2. A gas turbine comprising in combination a rotor having peripheral blading, a housing containing the rotor, a stationary nozzle member in the housing at one side of the rotor and formed with passages for motive fluid, a movable annular nozzle member mounted in the housing between the rotor and the stationary nozzle member, and capable of angular movement between a normal position in which motive fluid from the passages in the stationary nozzle member can flow through the movable nozzle member to the rotor blading, and another position in which motive fluid from the said passages is deflected away from the rotor blading by the movable nozzle member, a clutch disc situated within the movable nozzle member and secured to the rotor, the clutch disc having a laterally projecting peripheral flange which is split transversely at a plurality of positions to render it resilient and capable of outward radial deflection under the action of centrifugal force, and friction means through which the flange on the clutch disc is engageable with the movable nozzle member to enable the latter to be displaced by the clutch disc to the position for deflecting the motive fluid away from the rotor blading when the speed of the rotor exceeds a predetermined limit.

3. A gas turbine as claimed in claim 1 and having spring means for automatically returning the movable nozzle member to its normal position when the speed of the rotor is reduced sufficiently to release the flange on the clutch member from the movable nozzle member, and abutments provided on the movable nozzle member at positions where the motive fluid can impinge thereon and thereby temporarily hold the movable nozzle member in its displaced position.

TERENCE WILLIAM MILLNS.

REFERENCES CITED

The following references are of record in the file of this patent:

UNITED STATES PATENTS

| Number | Name | Date |
| --- | --- | --- |
| 1,008,550 | Loewenstein | Nov. 14, 1911 |
| 1,091,011 | Norton | Mar. 24, 1914 |
| 1,894,117 | Pollard | Jan. 10, 1933 |
| 2,247,151 | Clarke | June 24, 1941 |
| 2,269,235 | Warren | Jan. 6, 1942 |
| 2,459,519 | Graham | Jan. 18, 1949 |
| 2,491,059 | Ring | Dec. 13, 1949 |